United States Patent
Gruber et al.

(10) Patent No.: US 9,719,571 B2
(45) Date of Patent: Aug. 1, 2017

(54) RETRACTABLE LATCH BUMPER

(71) Applicant: Multimatic Inc., Markahm (CA)

(72) Inventors: Rudolf Gruber, Uxbridge (CA); Dennis Tak-Man Loui, Richmond Hill (CA)

(73) Assignee: Multimatic Inc., Markham (CA)

( * ) Notice: Subject to any disclaimer, the term of this patent is extended or adjusted under 35 U.S.C. 154(b) by 72 days.

(21) Appl. No.: 14/808,033

(22) Filed: Jul. 24, 2015

(65) Prior Publication Data

US 2015/0323032 A1 Nov. 12, 2015

Related U.S. Application Data

(63) Continuation of application No. 13/371,111, filed on Feb. 10, 2012, now Pat. No. 9,121,204.

(51) Int. Cl.
| | |
|---|---|
| *F16F 1/44* | (2006.01) |
| *E05B 77/38* | (2014.01) |
| *E05B 79/20* | (2014.01) |
| *E05B 81/06* | (2014.01) |
| *E05B 83/18* | (2014.01) |

(52) U.S. Cl.
CPC .............. *F16F 1/445* (2013.01); *E05B 77/38* (2013.01); *E05B 79/20* (2013.01); *E05B 81/06* (2013.01); *E05B 83/18* (2013.01); *F16F 2236/04* (2013.01); *Y10T 292/1077* (2015.04); *Y10T 292/1078* (2015.04)

(58) Field of Classification Search
CPC .......... E05B 77/38; E05B 79/20; E05B 81/06; E05B 83/18
See application file for complete search history.

(56) References Cited

U.S. PATENT DOCUMENTS

| 1,509,780 | A | | 9/1924 | Robetson | |
|---|---|---|---|---|---|
| 3,422,572 | A | | 1/1969 | Pollack | |
| 4,235,462 | A | * | 11/1980 | Torii | E05B 77/38 292/216 |
| 4,917,420 | A | * | 4/1990 | Rogers, Jr. | E05B 83/16 292/198 |
| 5,445,326 | A | * | 8/1995 | Ferro | E05B 83/26 292/203 |

(Continued)

FOREIGN PATENT DOCUMENTS

| CA | 2425857 A1 | 10/2003 |
|---|---|---|
| CN | 201874352 U | 6/2011 |

(Continued)

OTHER PUBLICATIONS

Suppelementary European Search Report issued in corresponding EP Application No. EP13746204; search complete. Jul. 4, 2016.

(Continued)

*Primary Examiner* — Vishal Sahni
(74) *Attorney, Agent, or Firm* — Blake, Cassels & Graydon LLP; John R. S. Orange

(57) ABSTRACT

A bumper for a closure, such as a tailgate, acts between the tailgate and a frame to bias a striker in to engagement with a latch. The bumper is moved to a retracted position during closing to reduce the force needed to close the tailgate. After latching, the bumper is conditioned to an extended position to assert the bias between the tailgate and frame.

5 Claims, 14 Drawing Sheets

(56) References Cited

U.S. PATENT DOCUMENTS

| | | | |
|---|---|---|---|
| 6,247,732 B1 * | 6/2001 | Alton | E05B 83/16 292/216 |
| 6,369,395 B1 * | 4/2002 | Roessler | B60Q 3/004 250/462.1 |
| 6,666,487 B2 | 12/2003 | Oxley et al. | |
| 6,715,808 B2 | 4/2004 | Oxley et al. | |
| 7,314,241 B2 | 1/2008 | Roach | |
| 7,367,598 B2 | 5/2008 | Arabia, Jr. et al. | |
| 7,445,258 B2 | 11/2008 | Rice et al. | |
| 7,475,920 B2 * | 1/2009 | Bigazzi | E05B 81/14 292/201 |
| 7,971,393 B2 * | 7/2011 | Gao | E05F 15/60 16/290 |
| 2007/0138802 A1 * | 6/2007 | Stasko | E05B 81/14 292/201 |
| 2008/0217933 A1 | 9/2008 | Kornev | |
| 2009/0189406 A1 | 7/2009 | Gleason | |
| 2010/0037528 A1 | 2/2010 | Lambright | |
| 2010/0314890 A1 | 12/2010 | Hemingway et al. | |

FOREIGN PATENT DOCUMENTS

| | | |
|---|---|---|
| GB | 2164086 A | 3/1986 |
| JP | 401068483 U1 | 5/1989 |
| JP | 2011106163 A1 | 6/2011 |
| WO | 2008061366 A1 | 5/2008 |

OTHER PUBLICATIONS

International Search Report issued in corresponding PCT Application No. PCT/CA2013/050093; search completed Jun. 15, 2013.

\* cited by examiner

RETRACTABLE LATCH BUMPER

CROSS-REFERENCE TO RELATED APPLICATIONS

This application is a Continuation Application of U.S. patent application Ser. No. 13/371,111 filed on Feb. 10, 2012, entitled "Retractable Latch Bumper" and the entire contents of which are incorporated herein by reference.

FIELD OF THE INVENTION

The present application relates to a latching mechanism to secure a closure panel in an opening.

DESCRIPTION OF PRIOR ART

Openings are provided in structures, such as vehicle bodies, to permit access to the structures. Those openings are commonly closed by a panel, e.g. a door, that can be opened to allow access through the opening and closed to inhibit such access. The closure panels will typically be held in place by a latching mechanism which is selectively operable either to hold the panel in a closed position or allow it to move to an open position.

The latching mechanism will typically have a latch that cooperates with a striker to provide a mechanical stop. To account for manufacturing variances in the latching mechanism as well as miss alignments between the mounted components, a certain minimum clearance between the latch and striker need to be maintained to allow latching and de-latching. In many applications, a seal is provided around the opening, either on the panel or on the periphery of the opening. The seal prevents noise and water entering the structure and acts to provide a bias of the panel away from the opening so that the latch and striker are biased into engagement. This inhibits undesirable relative movement between the latch and striker that otherwise can manifest itself as a rattle, creak or other noise within the structure.

In some applications, such as a tailgate for a pickup truck, seals are not provided around the opening and accordingly a resilient bumper is used to bias the striker into engagement with the latch.

In both arrangements, the resilience provided by the seal or the bumper must be overcome in order to move the closure sufficiently in to the opening to activate the latch and hold the closure in the closed position. Significant momentum is required to overcome the bias and ensure proper latching, which leads to "slamming" of the closure. This leads to customer dissatisfaction as they have to exert excessive force to latch the closure, and where the closure is operated by a motor for power closing, the forces required from the motor are sufficient to pose a risk to unwary personnel.

U.S. Pat. No. 7,971,393 shows a door operating mechanism in which a shape memory alloy wire is used to vary the forces acting on the door during closing and after latching. The wire is stretched as the door closes and subsequently heated to regain its original length and impose a force on the door. Such an arrangement however still requires sufficient force to stretch the wire during closure, as well as the complication of heating the wire to regain the force acting on the door.

OBJECT OF THE INVENTION

It is therefore an object of the present invention to obviate or mitigate the above disadvantages.

SUMMARY OF THE INVENTION

In general terms, the present invention provides a latching mechanism in which a resilient bumper acts between the closure panel and the frame of the opening to bias a latch and striker in to engagement. The bumper is moved to a retracted position in which the bias is removed as the closure engages the latch to reduce the force required, and, after the latch is engaged, returns to an engaged position in which the bias is applied.

According to one aspect of the present invention there is provided a latching mechanism to secure a closure panel in an opening defined by a frame. The latching mechanism includes a latch and a striker on respective ones of the panel and the frame. The striker cooperates with said latch to inhibit movement of the panel relative to the frame. A bumper assembly is operable between the panel and the frame to bias the striker into engagement with the latch. The bumper assembly includes a bumper moveable between an engaged position in which the bumper acts to apply a bias between the latch and the striker, and a retracted position in which said bias is removed. Upon movement of the closure panel to close the opening, the bumper is moved to the retracted position so as to facilitate engagement of said striker with said latch.

According to a further aspect of the present invention there is provided a latching mechanism for securing a closure panel in an opening of a vehicle. The closure panel is moveable relative to the opening between open and closed position. The latching mechanism includes a latch, a striker cooperating with the latch to inhibit relative movement between said closure panel and the opening in the closed position, and a bumper assembly operable between the closure panel and the opening in the closed position. The bumper assembly includes a bumper operable in a first condition to oppose relative movement between the striker and the latch, and in a second position is not operable to oppose such movement. A control unit conditions the bumper to attain the second condition upon movement of the closure panel from the open position to the closed position and to attain the first condition upon attainment of the closed position.

According to a still further aspect of the present invention there is provided a bumper assembly for controlling relative movement between a closure panel and a frame defining an opening. The bumper assembly includes a bracket and a bumper carried by the bracket. The bumper is moveable relative to the bracket between a retracted position and an engaged position. A biasing element biases the bumper to one of the positions. An actuator is operable against the biasing element to permit the bumper to move to the other of the positions.

According to a still further aspect of the invention there is provided a method of securing a closure panel in an opening defined by a frame. The method comprises the steps of retracting a bumper on one of the closure panel and frame so as to facilitate engagement of a striker with a latch, engaging the latch with the striker to inhibit relative movement between the closure panel and frame, and releasing the bumper to act between said closure panel and frame to bias the striker in to engagement with the latch and inhibit relative movement therebetween.

BRIEF DESCRIPTION OF THE DRAWINGS

Embodiments of the invention will now be described by way of example only with reference to the accompanying drawings in which.

Figure 1:
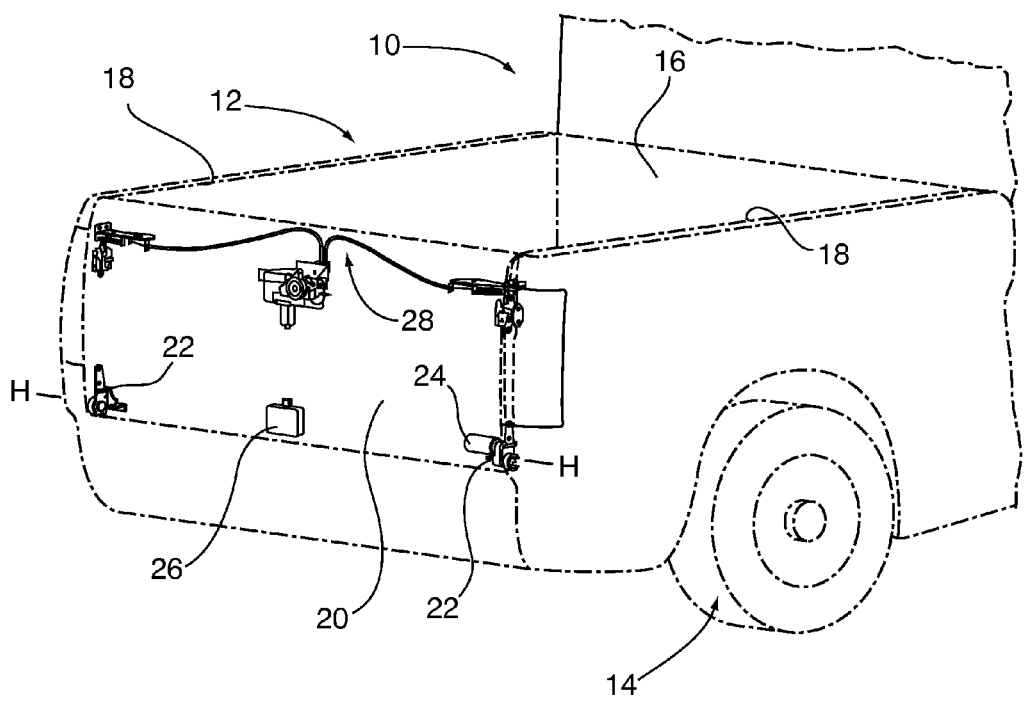
FIG. 1 is a rear perspective view of a pickup vehicle showing the disposition of components associated with a latching mechanism.
Figure 2:
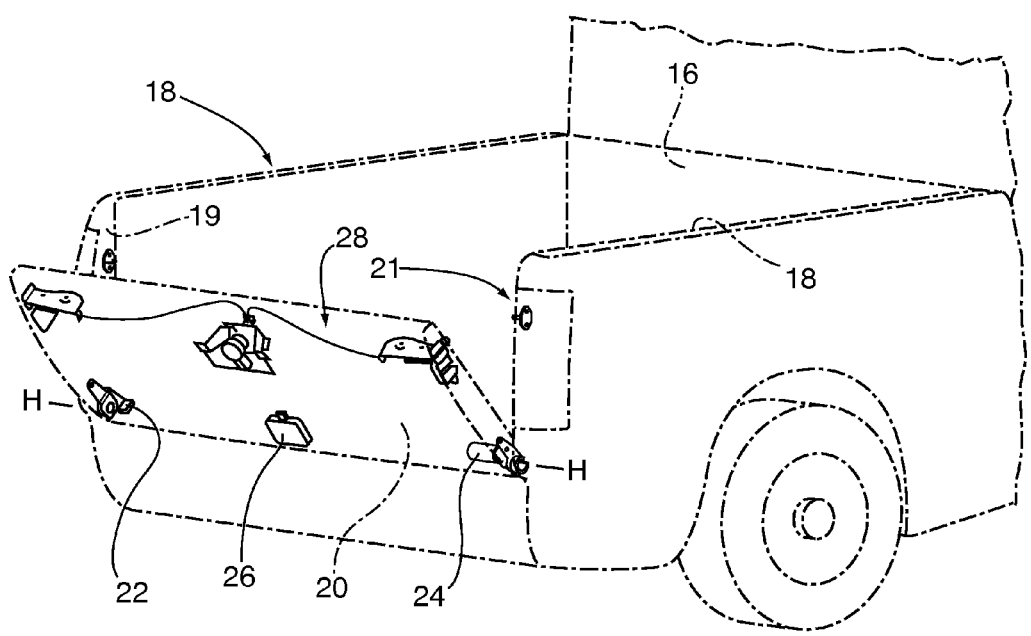
FIG. 2 is a view similar to FIG. 1 showing a tailgate of the pickup truck in an open position.
Figure 3:
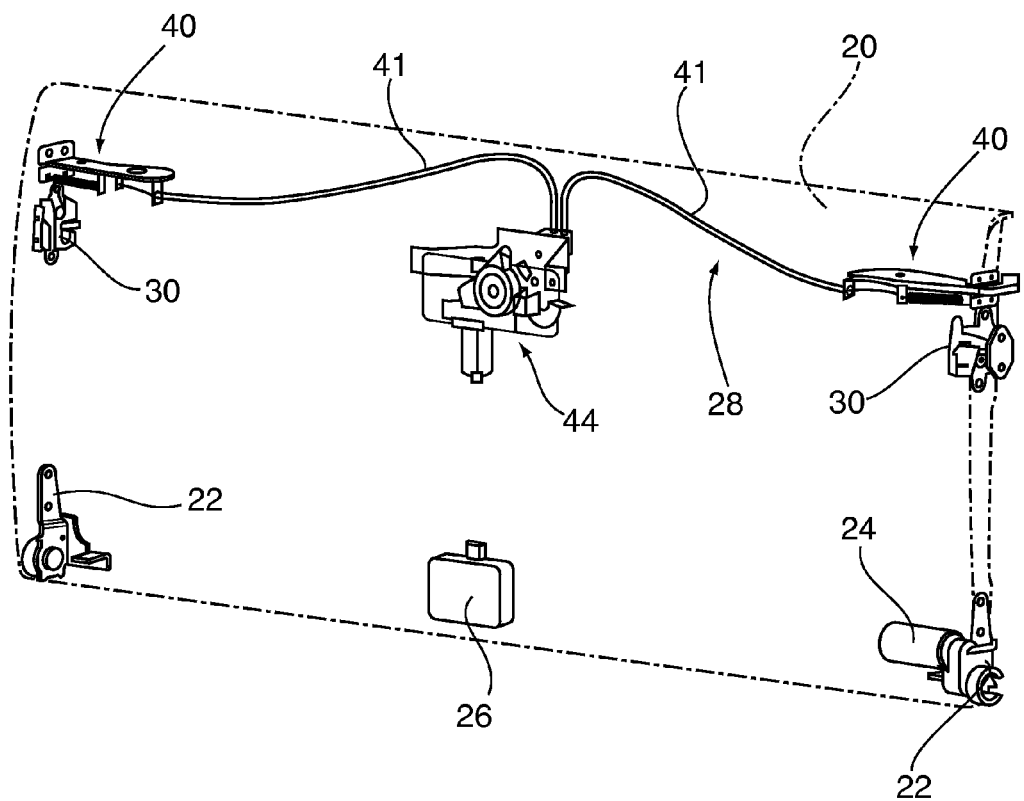
FIG. 3 is an enlarged view of the tailgate of FIG. 2.
Figure 4:
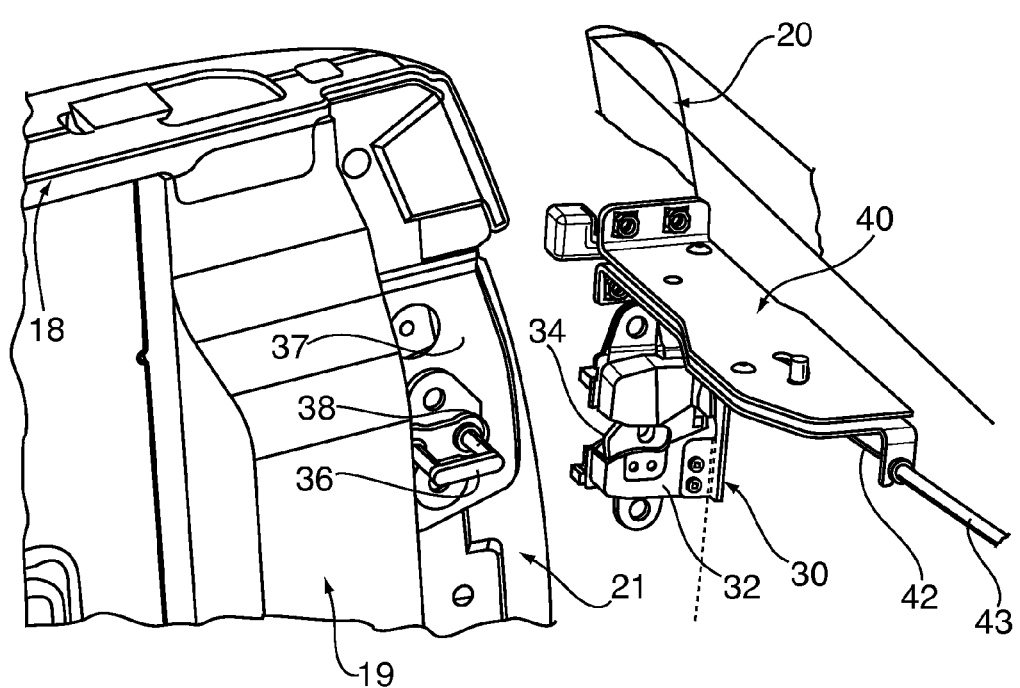
FIG. 4 is a perspective view of a portion of a latching mechanism in an open position.
Figure 5:
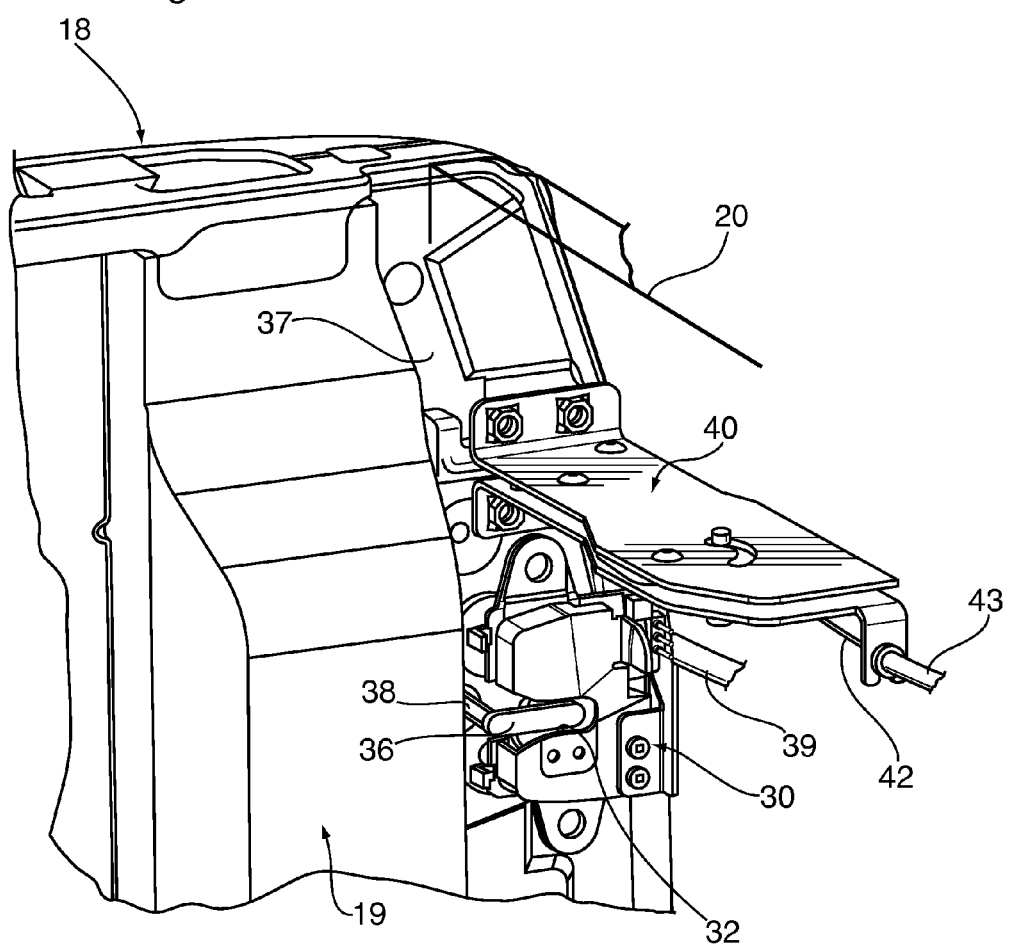
FIG. 5 is a view similar to FIG. 4 with the tailgate in a closed position.
Figure 6:
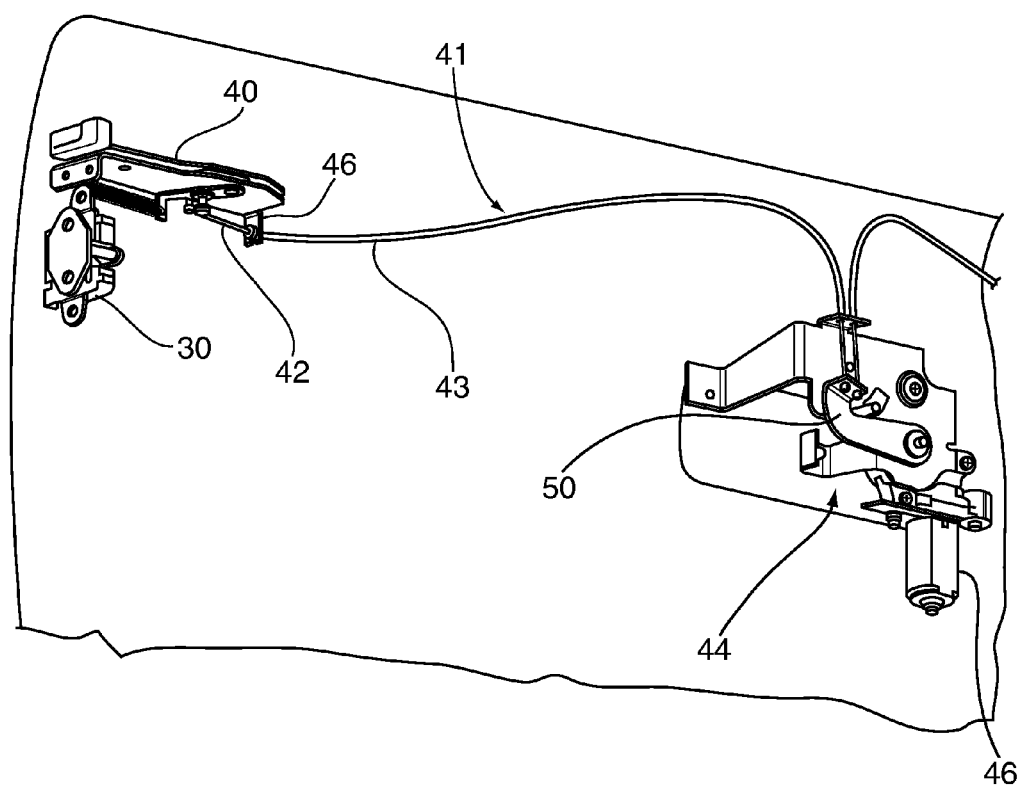
FIG. 6 is a perspective view from below of the components shown in FIG. 2.

Referring therefore to FIGS. 1 to 4, a vehicle 10 has a pickup box 12 located above rear wheels 14. The pickup box 12 has a front panel 16 and a pair of side panel assemblies 18. Structural support for the side panel assemblies 18 is provided by a pair of D-pillars 19 at the rear of the box 12. The rear of the assemblies 18, D-pillars 19 (FIG. 4), together with the floor of the box 12 collectively define a frame 21 for a rear opening.

A tailgate 20 extends across the opening defined by the frame 21 and marginal lateral edges of the tailgate 20 overlie portions of the frame 21. The tailgate 20 pivots about a transverse horizontal pivot axis HH so that the tailgate 20 can move between a closed position, as shown in FIG. 1, through an intermediate position shown in FIG. 2 to a fully open position in which the tailgate 20 extends generally horizontally in alignment with the floor of the box 12. As will be appreciated, the box 12 is formed from individual panels and pressings in a conventional manner and its dimensions will vary according to particular application and size of the vehicle.

The tailgate 20 is connected to the frame 21 by hinges 22 and, in the embodiment shown, is moved between open and closed positions by an electric motor 24. The motor 24 is controlled by the operator of the vehicle through a control unit 26 mounted within the tailgate 20.

The tailgate 20 is held in its closed position by a latch mechanism 28. As can best be seen in FIGS. 3 and 4, the latch mechanism includes a pair of latches 30 carried on the tailgate 20 adjacent each lateral edge. The latches 30 are of conventional construction and have a fish mouth 32 and a ratchet 34 that can move from an open position, in which the fish mouth 32 is open, to a closed position, in which the ratchet 34 extends across the fish mouth 32.

A striker 36 is secured to the inner face 37 of the side panel assemblies 18 in alignment with the fish mouths 32. The striker 36 has a pair of spaced bars 38, the rearward one of which is positioned to engage the fish mouth 32 and be encompassed by the ratchet 34 with the tailgate in the closed position. The ratchet 34 is controlled in a conventional manner to be retained in the locked position, in which relative movement between the tailgate 20 and the side panel assemblies 18 is inhibited or may be released by an electric actuator (not shown), or manually, to allow the tailgate 20 to be moved from the closed to the open position. As noted above, the latches 30 are conventional and need not be described in further detail. Electrical signal lines 39 extend from sensors within the latches 30 to control unit 26 to indicate a closed or open condition of the latch.

The latch mechanism 28 also includes a pair of bumper assemblies 40 that are similar to one another except as for hand. The bumper assemblies 40 are mounted to respective lateral edges of the tailgate 20 adjacent to the latches 30. Each of the bumper assemblies 40 is connected through flexible force transmitting members 41, shown as a cable 42 within a sleeve 43, to an operating unit 44. The operating unit 44 includes an electric motor 46 that operates through a gear transmission 48 to move an operating lever 50 (shown in FIGS. 6 and 11-13) through a limited arc, as indicated by arrow A. Preferably the transmission 48 is a self locking arrangement, such as a worm drive, so that it is able to maintain the lever 50 in the required position without application of electrical power to the motor 46. The sleeves 43 extend between a pair of forked brackets 86 on the bumper assembly 40 and operating unit 44. One end of the cable 42 is connected to the operating lever 50 such that rotation of the lever 50 will produce a corresponding translation of the cable 42 in the sleeve 43.

Figure 7:
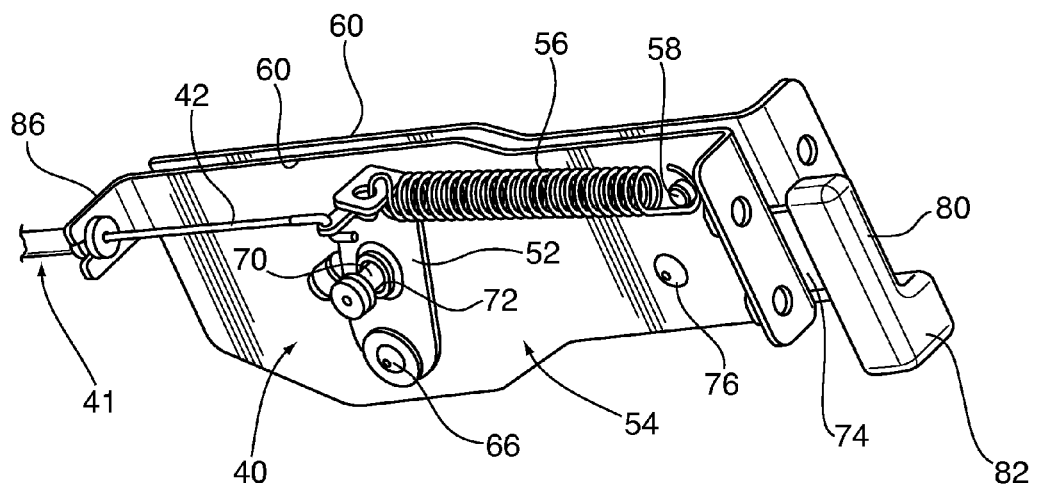
FIG. 7 is an enlarged view from below of a bumper assembly shown in FIG. 6.
Figure 8:
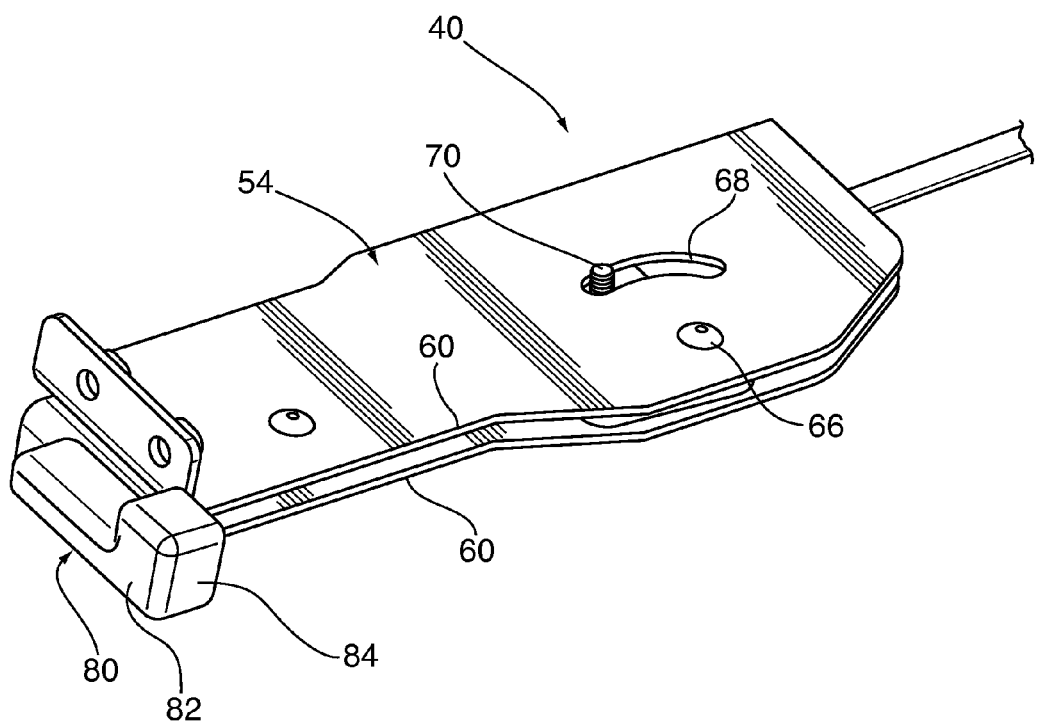
FIG. 8 is a view of the bumper assembly of FIG. 7 from above.

The opposite end of the cable 42 is connected to a link 52 (FIGS. 6 and 7) that is pivoted to a bracket 54. A biasing element in the form of a tension spring 56 is connected between the link 52 and a pin 58, extending from the bracket 54.

The bracket 54 includes a pair of spaced plates 60 as best seen in FIGS. 7-10. A cam 62 having a peripheral cam surface 64 is located between the plates 60 and pivotally connected to each of the plates 60 by a pivot pin 66. The pin 66 also connects the link 52 to the bracket 54 and holds the plates 60 at the required spaced relationship.

An arcuate track 68 is formed in the lower of the plates 60 and a stud 70 extends from the cam 62 through the arcuate track 68 and through a slot 72 formed in the link 52. Movement of the link 52 about the pin 66 is thus transferred through the stud 70 to the cam 62 to cause rotation of the cam 62 about the pivot pin 66. The spring 56 therefore acts to bias the cam 62 in one direction and the cable can act against the bias to rotate the cam in the opposite direction.

A lever 74 is pivotally mounted to the plates 60 through a pivot pin 76 and has a tail 78 that bears against the cam surface 64. The opposite end of the lever 74 to the tail 78 carries a bumper 80 that has a resilient body 82 with an end face 84.

Figure 9:
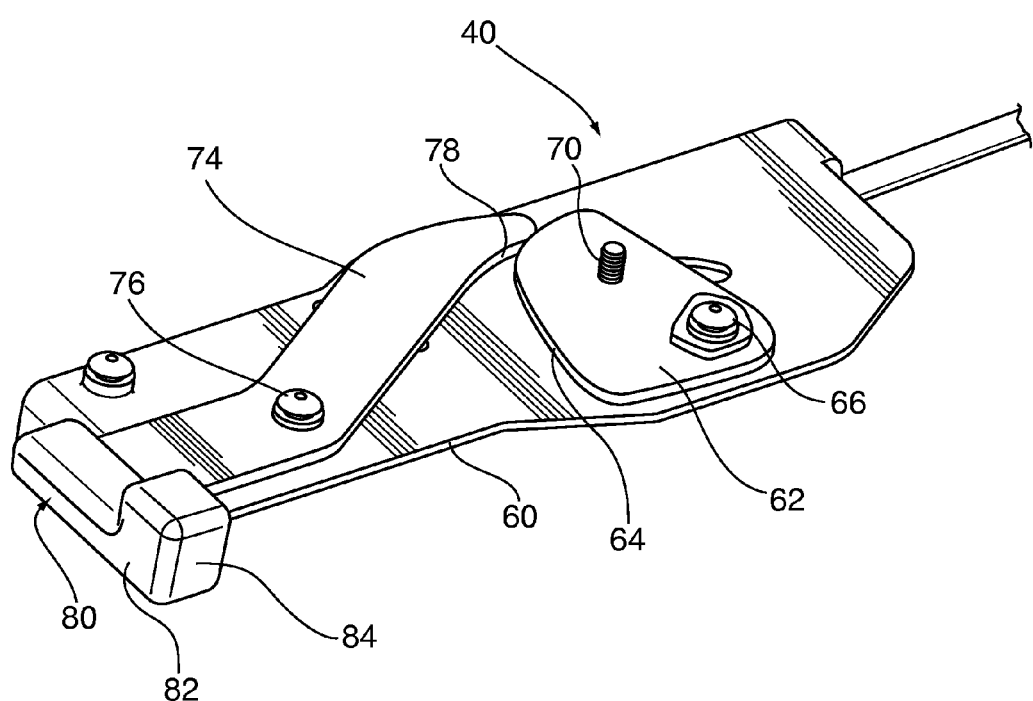
FIG. 9 is a view, similar to FIG. 8, with portions of the bumper assembly removed for clarity.
Figure 10:
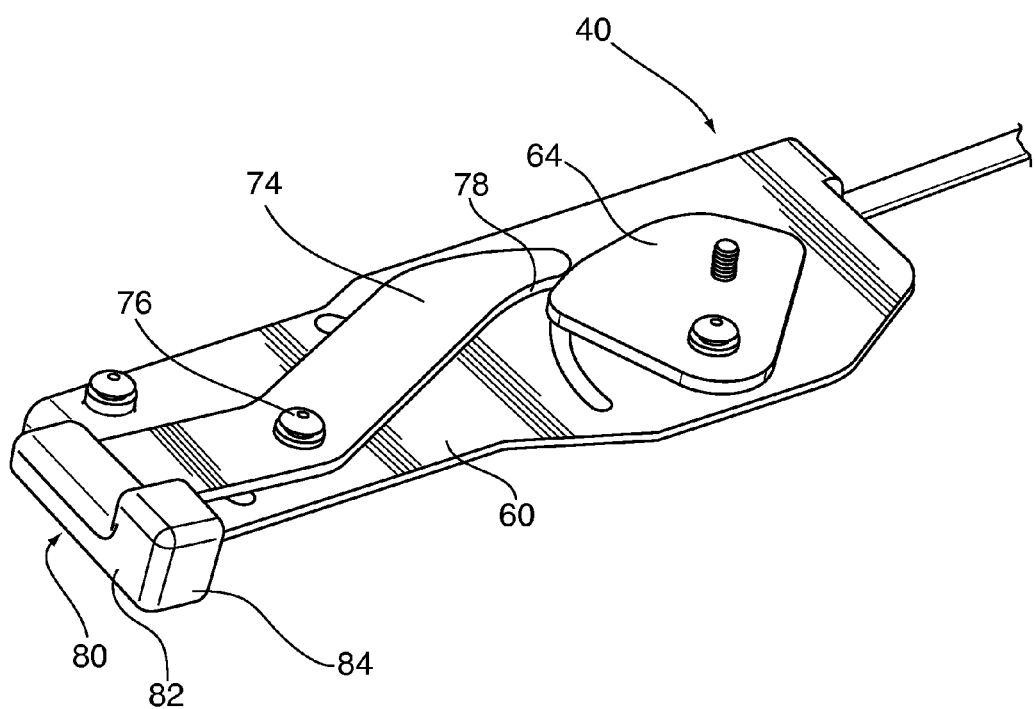
FIG. 10 is a view, similar to FIG. 9, showing the components moved to an alternate configuration.
Figure 11:
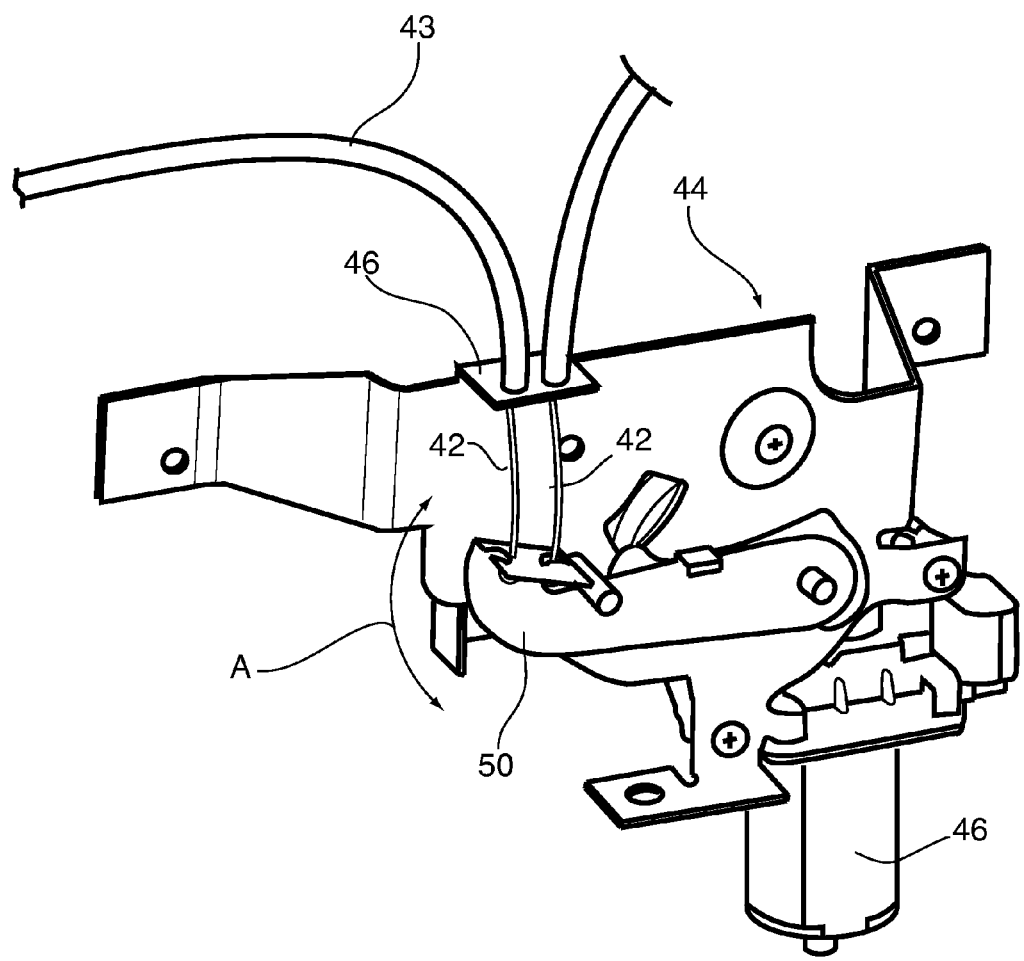
FIG. 11 is an enlarged view of an actuating mechanism shown in FIG. 3.
Figure 12:
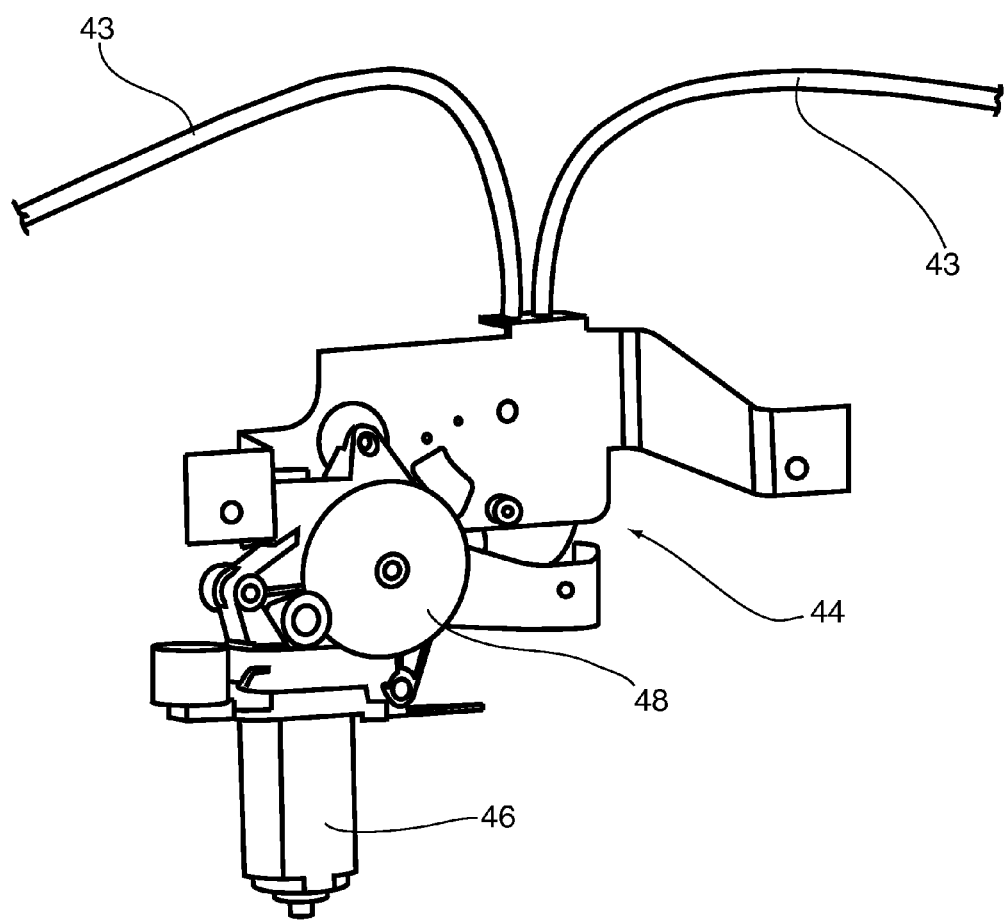
FIG. 12 is a rear view of FIG. 11.
Figure 13:
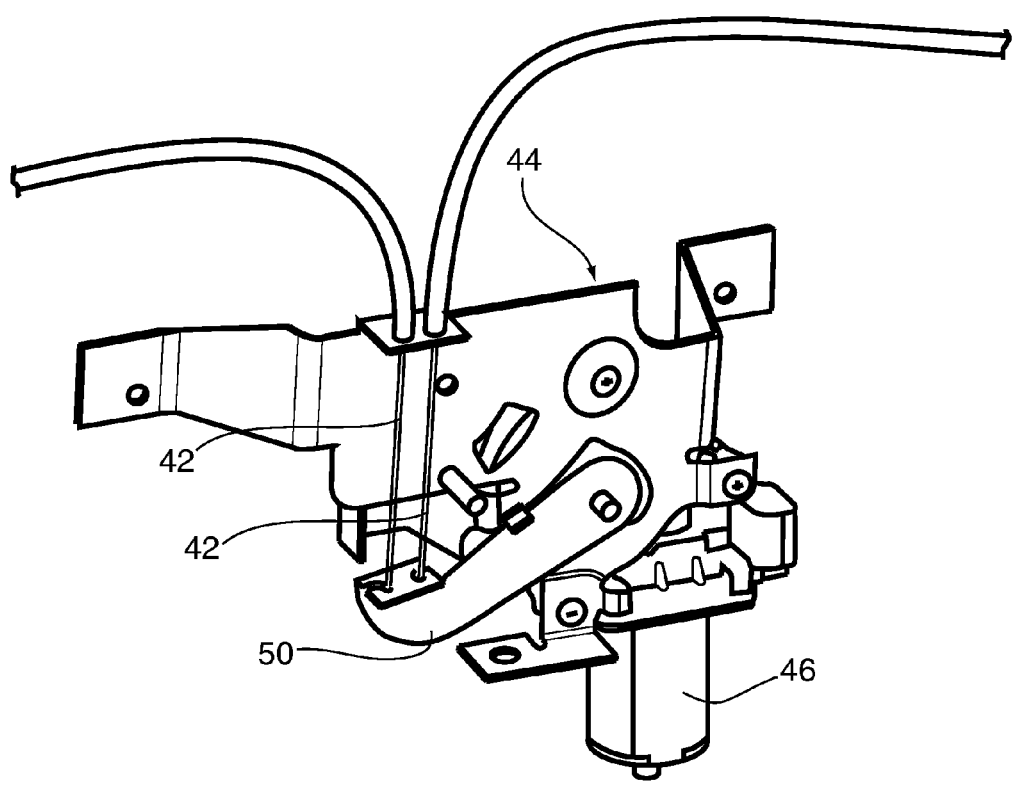
FIG. 13 is a view, similar to FIG. 11, in an alternate configuration, corresponding to the configuration shown in FIG. 10.

Movement of the lever 74 is controlled by the cam 62 through the abutment of the tail 78 with the cam surface 64. The cam surface 64 is of progressively increasing radius in a clockwise direction as viewed in FIG. 9. Thus with the cam 62 rotated fully counter clockwise, as shown in FIG. 9, the tail 78 engages the cam 64 at a point of maximum radius so that the end face 84 extends from the bracket 54. With the cam 64 rotated fully clockwise, as shown in FIG. 10, the tail 78 bears against the cam surface 64 at a minimum radius, and allows the end face 84 to retract from the extended position shown in ghosted line. The rotation of the cam 64 therefore controls the position of the bumper 80 between extended and retracted positions. The cam profile is such that a load applied through the lever 74 will not induce rotation of cam 64, so that the bumper 80 is maintained in the required position.

The bumper assemblies 40 are positioned on the tailgate 20 such that the end face 84 is juxtaposed with a lateral face of the D-pillar 19. In this position, the bumper 80 may exert a resilient force tending to bias the tailgate 20 away from the D-pillar 19.

The operation of the latch mechanism 28 can best be understood by first considering the tailgate 20 in a fully open position. In this condition, the motor 46 has rotated the operating lever 50 such that the tension in the cables 42 is removed and the link 52 can move about the pin 58 under the influence of the spring 56. The cam 64 is thus rotated fully counter clockwise, as shown in FIG. 9, such that the tail 78 is engaged at the maximum radius of the cam surface 64. The bumper 80 is thus extended from the tailgate 20.

Figure 14:
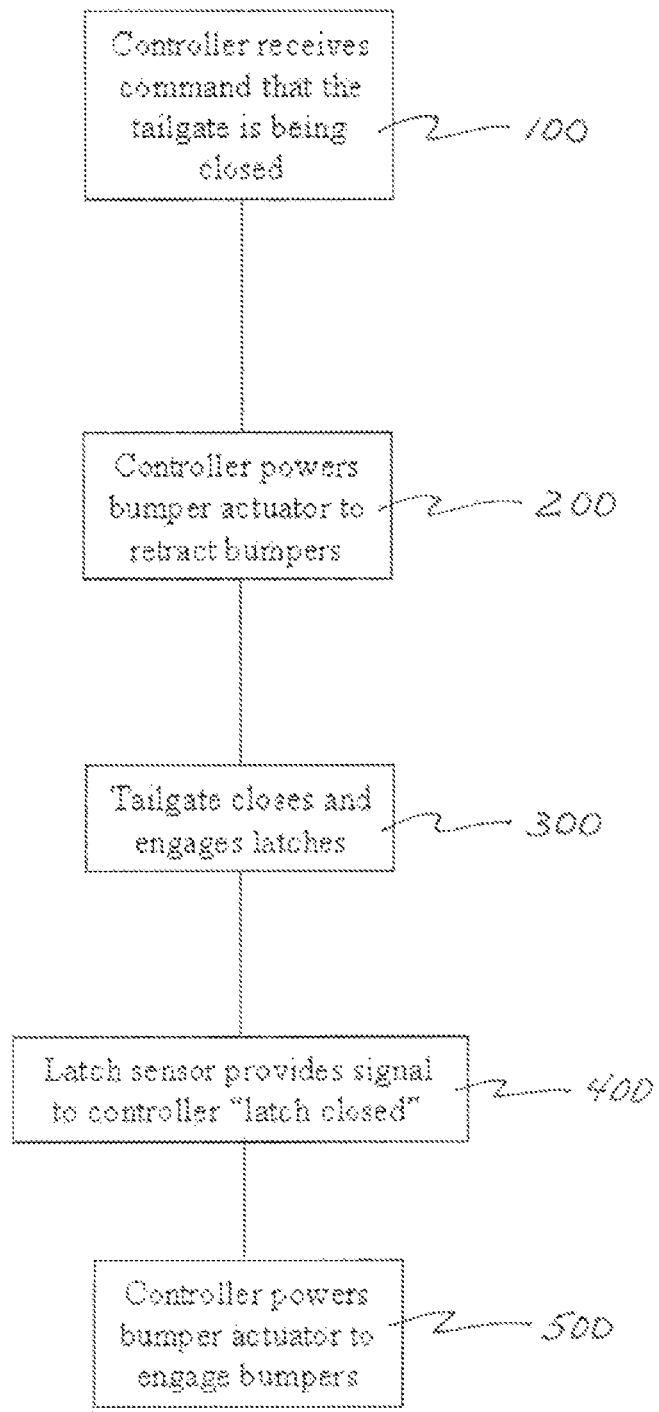
FIG. 14 is a flowchart showing the sequence of operation of the latching mechanism shown in FIGS. 1-13.

In order to close the tailgate, the sequence shown in FIG. 14 is initiated. At step 100, a closing signal is sent from a remote control or a vehicle control (not shown) to the control unit 26. The control unit 26 directs power to the motor 24 to rotate the tailgate 20 about the horizontal axis HH.

As the motor 24 lifts the tailgate towards a closed position, the control unit 26 responds, step 200, to the "close" signal to operate the motor 46 and rotate the operating lever 50 counter clockwise. Rotation of the operating lever 50 is transferred through the cable 42 and rotates the link 52 about its pin 66 against a bias of the spring 56. Rotation of the link 52 causes a corresponding rotation of the cam 62 to present a reduced radius cam surface 64 to the tail 78. The lost motion connection between the cam surface 64 and the tail 78 of the lever 74 allows the bumper to float about the pivot pin 76 as the tailgate moves towards the closed position. The motor 46 holds the operating lever 50 to maintain the cam 64 at its minimum radius during the closing operation.

As the tailgate 20 approaches the D-pillar 19, the fish mouth 32 of the latch 30 engages the bar 38 of striker 36 and trips the ratchet 34 to encompass the bar, as indicated at step 300. The lever 74 carrying the bumper 80 is free to rotate about the pivot pin 76 and so does not oppose the closing motion of the tailgate 20. If the bumper 80 has remained in the extended position during movement to the closed position, abutment of the end face 84 with the D-pillar 19 will cause the lever 74 to rotate about the pivot pin 76 to a retracted position.

With the ratchet 34 engaged in the striker 36, a signal is sent through the signal lines 39 to the control unit 26, step 400. Upon receiving an indication that the latches 30 have engaged the striker 36, the control unit 26 signals the motor 24 to rotate the operating lever 50 and release the tension in the cables 52, step 500. As the lever 50 rotates, the spring 56 rotates the cam 62, bringing the cam surface 64 into engagement with the tail 78. The lever 74 is rotated about the pivot pin 76 until the end face 84 of the bumper 80 engages the D-pillar. The force of spring 56 applies a bias between the tailgate 20 and the D-pillar 19 to force the ratchet 34 into engagement with the bars 38 of the striker 36. The extent of rotation of the cam 62 about the pivot pin 66 will depend upon the clearance available between the D-pillar 19 and the tailgate 20 in the latched condition and minor variations in that spacing is accommodated by the cam profile. With the bias between the tailgate 20 and the D-pillar 19, relative movement between the latches 30 and the striker 36 is inhibited and rattle is avoided. The spring bias on the cam 64 ensures that the bumper 80 is constantly urged against the D-pillar by the lever 74 to take up any clearance and the cam profile prevents release of that loading.

To move the tailgate from the closed to the open position, the latches 30 are released by the control unit 26 and the motor 24 operated to move the tailgate toward the open position. As the tailgate 20 moves away from the D-pillar 19, the lever 74 will continue to rotate under the influence of the spring 56, until limited by the track 68, and extend the bumper 80 fully from the tailgate 20.

It will be seen from the above description, therefore, that as the tailgate 20 moves towards a closed position, the bumper 80 is conditioned to move from an extended position to a retracted position in which it does not inhibit closure of the tailgate 20. Once the tailgate 20 is closed, the bumper 80 is moved into an extended position in which it can provide the required bias between the tailgate 20 and the D-pillar 19. In this way, the force required to close the latch 30 is reduced, but the resilience of the bumper 80 is available after latching to inhibit rattling.

The above description has assumed that the operation of the tailgate 20 is performed by a motor 24 but it will be apparent that the latching mechanism may be utilized on manually operated tailgate or other closures. With a manually operated tailgate, a signal is sent through the signal lines 39 to the control unit 26 when the latch is de-latched. The control unit 26 signals the motor 46 to retract the bumpers 80. The motor 46 maintains the bumper 80 in the retracted position while the tailgate is not latched. The signal for completing the latching serves to release the bumper once the tailgate is closed.

Although described in the context of a tailgate for a vehicle, it will be apparent that other closures of a vehicle may utilize similar arrangements where conventional seals are not provided around the exterior of the opening.

What is claimed is:

1. A bumper assembly for controlling relative movement between a closure panel and a frame defining an opening, said bumper assembly including a bracket, an operating link pivotally mounted to said bracket for rotation about an axis, a cam member pivotally connected to said bracket for rotation about said axis, said cam member having a peripheral cam surface with a progressively increasing radius from said axis of rotation, a lever mounted on said bracket and moveable relative thereto between a retracted position and an engaged position, said lever having a resilient bumper mounted thereon and a tail spaced from said bumper and engagable with said peripheral cam surface, a connector extending between said operating link and said cam member to rotate said cam member upon movement of said link, a biasing element acting between said operating link and said bracket to bias said operating link to move said cam member to a position in which said tail engages said cam member at a maximum radius of said cam surface and said bumper is moved toward said engaged position, and an actuator operable against said biasing element to rotate said cam member toward a position in which said tail engages a minimum radius of said cam surface and thereby permit said bumper to move to said retracted position.

2. A bumper assembly according to 1 wherein said actuator includes a tensile member to rotate said cam against said biasing element.

3. A bumper assembly according to claim 1 wherein said bracket includes a pair of spaced plates and said cam member is disposed between said plates.

4. A bumper assembly according to claim 3 wherein said operating link is mounted on one of said plates on an opposite side thereof to said cam member and said connector is a pin extending through said plate to connect said link and said cam member.

5. A bumper assembly according to claim 3 wherein said lever is disposed between said plates.

* * * * *